United States Patent [19]
Coe

[11] 3,709,534
[45] Jan. 9, 1973

[54] ADAPTOR DEVICE FOR TRAILER DOLLY WHEELS AND PADS

[76] Inventor: William A. Coe, 20 Westfield Road, West Hartford, Conn. 06119

[22] Filed: May 6, 1971

[21] Appl. No.: 141,065

[52] U.S. Cl............................287/119, 287/53 TK
[51] Int. Cl...............................................F16b 7/00
[58] Field of Search............287/2, 108, 119, 53 TK; 279/1 A; 81/177 A

[56] References Cited

UNITED STATES PATENTS

| 2,987,334 | 6/1961 | Wendling | 287/119 R |
| 2,878,701 | 3/1959 | Weersma | 287/2 X |
| 2,714,026 | 7/1955 | Schultz | 287/2 |
| 2,287,725 | 6/1942 | Conte | 287/119 R |
| 2,483,662 | 10/1949 | Niederhiser | 279/1 A |

FOREIGN PATENTS OR APPLICATIONS

| 944,374 | 12/1963 | Great Britain | 287/53 TK |

*Primary Examiner*—Andrew V. Kundrat
*Attorney*—John C. Hilton

[57] ABSTRACT

An adaptor for motorizing the crank operation of dolly wheels and pads. This device consists of a sleeve member which is secured by a bolt to the square end of the crank shaft so as to enable the shaft to be rotated by power means.

1 Claim, 2 Drawing Figures

PATENTED JAN 9 1973

3,709,534

INVENTOR.
WILLIAM A. COE

ADAPTOR DEVICE FOR TRAILER DOLLY WHEELS AND PADS

This invention relates to devices for trailers and more particularly to an adaptor device for power driving the crank shaft of the dolly wheels or the like.

It is therefore the primary purpose of this invention to provide an adaptor which may be secured to the crank shaft of the dolly wheels or pads so as to rotate the crank shaft by power means rather than by manual means as was done in the prior art.

Another object of this invention is to provide an adaptor which will be a sleeve that will be secured to the square end of the crank handle by bolt means, the sleeve having a projection for insertion into the shaft of an air motor, an electric motor or the like so as to lower and raise the dolly wheels or pads by power.

Another object of this invention is to provide an adaptor device which will be fitted to the crank shaft of the dolly or pad and will be secured thereto by a transverse bolt receiving a nut fastener.

A further object of this invention is to provide an adaptor which will have a longitudinal square opening which will freely receive the square end of the crank shaft so that the adapter will effectively and non-slippingly rotate the crank shaft to lower or raise the dolly wheels or pads of the trailer.

Other objects of the present invention are to provide an adaptor device for trailer dolly wheels or pads which is simple in design, inexpensive to manufacture, rugged in construction, easy to use and efficient in operation.

These and other objects will become readily evident upon a study of the following specification together with the accompanying drawing wherein.

Figure 1:
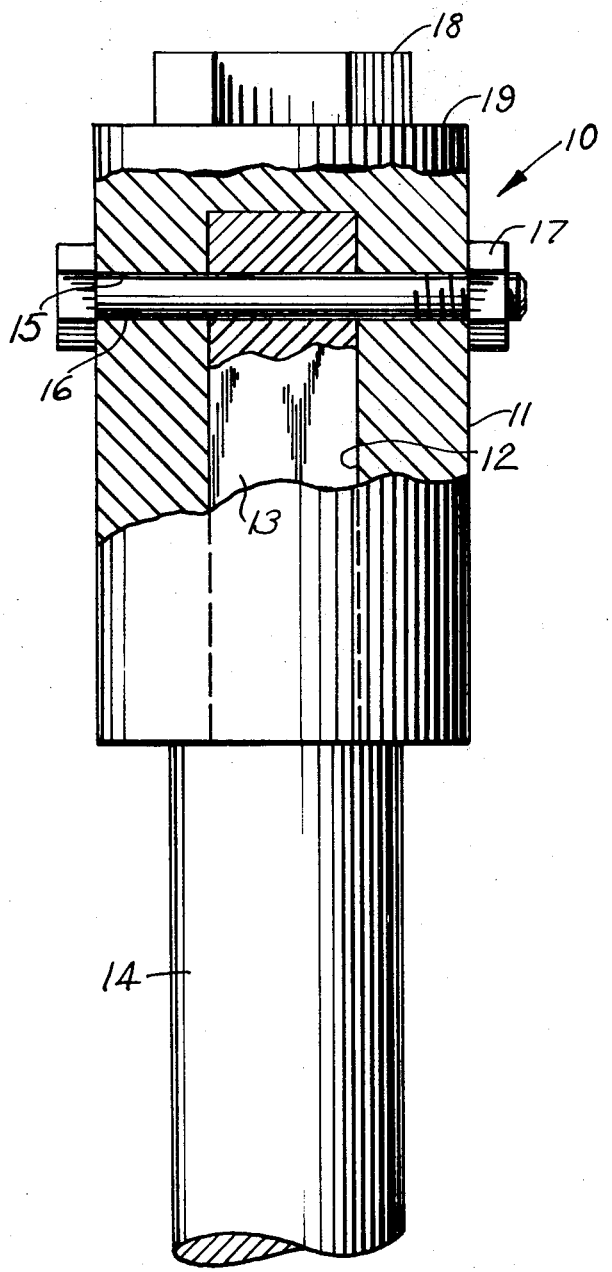
FIG. 1 is a vertical view of the present invention shown secured to the crank shaft and is partly broken away.
Figure 2:
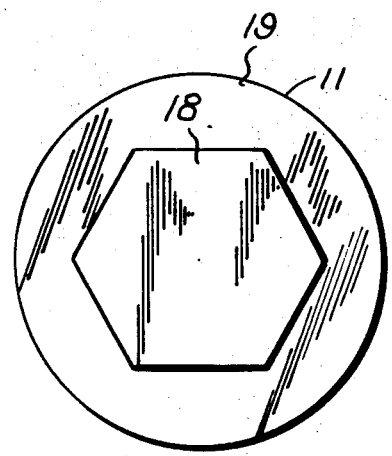
FIG. 2 is a top plan view of FIG. 1 without the bolt element.

According to this invention, an adaptor 10 is shown to consist of a sleeve 11 of metallic material having a square configurated opening 12 which slidably receives the square end 13 of the crank shaft 14 which provides a means of lowering and raising the dolly wheels or pads of the trailer. A transverse opening 15 through sleeve 11 on the square end 13 of shaft 14, receives a bolt 16 to which is threadably received a nut fastener 17, the bolt 16 and the nut 17 serving to render the sleeve 11 stationary upon the shaft 14. The hexagonal projection 18 extends outwards from the end wall 19 of sleeve 11 and provides a means for an air-motor or an electric motor or the like to engage sleeve 11 so as to rotate the shaft 14 to lower or raise the dolly wheels of the trailer.

In use, the motor shaft receives the projection 18 of sleeve 11 and when the motor is turned on, the sleeve 11 will rotate the shaft 14 in a clockwise or counter-clockwise direction and thus lower the dolly or pads of the trailer.

It will be noted that the air-motor for rotating adaptor 10, will be connected to the air system on the tractor and the electric motor, if desired, will be connected to the battery or electrical system on the tractor.

It shall also be recognized that a hydraulic motor may be employed to rotate the adaptor and connected crank shaft.

What I now claim is:

1. In combination with the shaft used to raise and lower a truck trailer dolly the improvement comprising an end portion of the truck trailer dolly shaft having an elongated non-circular end portion of smaller cross section than the circular shaft, and defining an axially outwardly facing radially extending shoulder surface therebetween, a sleeve defining at one end an elongated non-circular bore for snugly receiving said shaft end portion, and said sleeve bore having an axial length of approximately three times the cross sectional width of its non-circular contour maximum width, said non-circular sleeve bore having a transverse inner end wall for abutting the end of said non-circular shaft end portion, a threaded bolt extending through aligned openings in said sleeve and in said shaft end portion, said bolt being arranged adjacent the end of said shaft end portion which abuts the transverse inner wall of said bore and spaced therefrom less than the largest cross-sectional width of said non-circular end portion, said sleeve having a tool receiving hexagonal projection on the end axially opposite said elongated non-circular sleeve bore for receiving a conventional socket held in a conventional air motor or the like, and said shaft elongated non-circular end portion and said sleeve bore having equal axial dimensions so that the end of said sleeve opposite said hexagonal projection abuts said shoulder surface on said shaft and said non-circular shaft end bottoms on said transverse inner end wall.

* * * * *